Feb. 8, 1938.　　　E. J. WOLTERSDORF　　　2,107,463
GEARING
Filed April 7, 1937
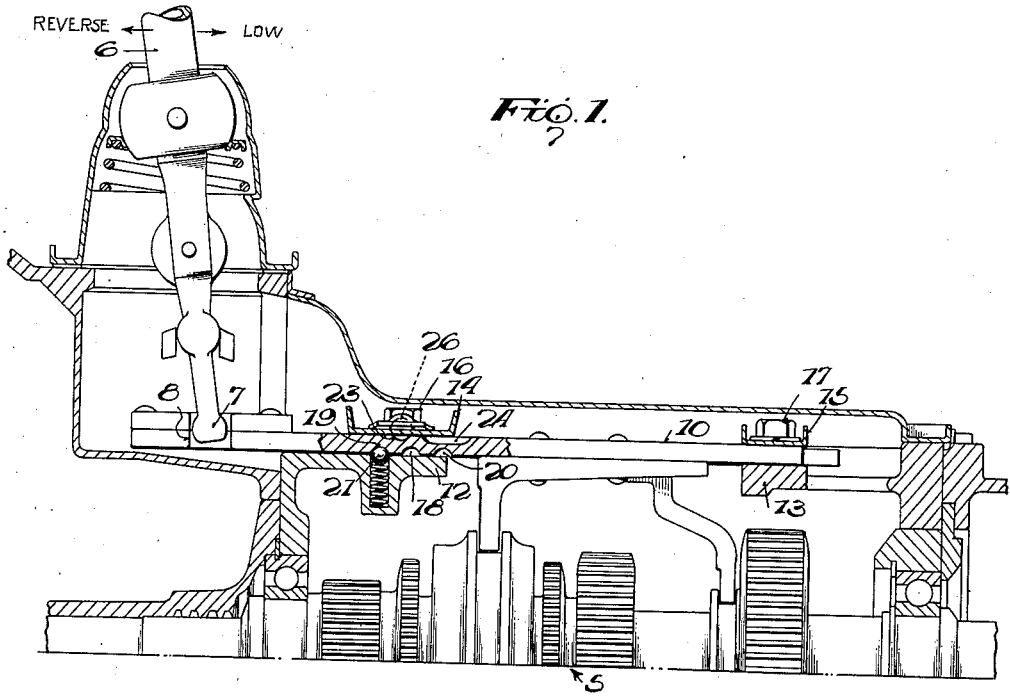
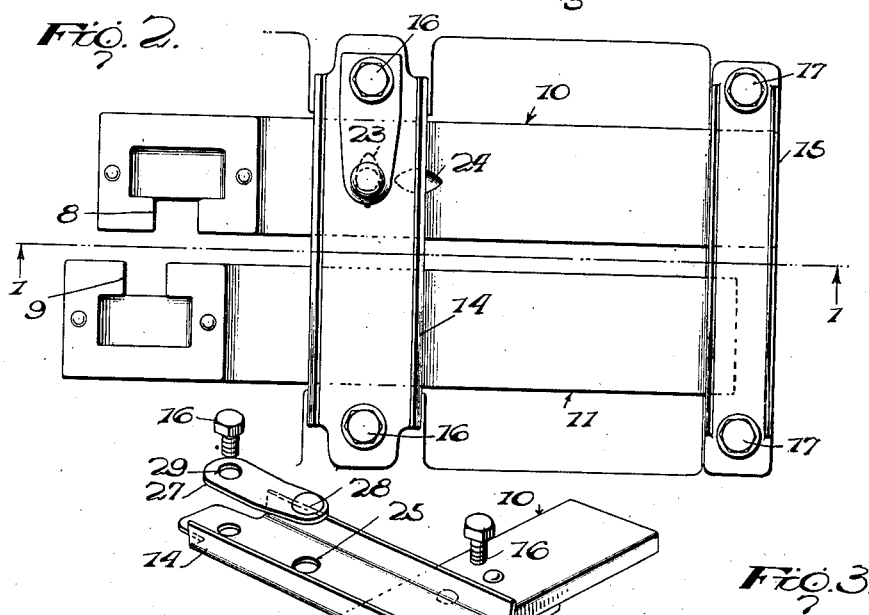
Inventor
Elmer J. Woltersdorf Patented Feb. 8, 1938

2,107,463

UNITED STATES PATENT OFFICE 2,107,463

GEARING

Elmer J. Woltersdorf, Van Horne, Iowa

Application April 7, 1937, Serial No. 135,558

4 Claims. (Cl. 74—475)

My invention relates to improvements in transmission gearing for use in connection with automobiles or the like.

An important object of the invention is to provide means to securely hold the gear shift rail or bar in the shifted position, against accidental displacement.

A further object of the invention is to provide means of the above mentioned character which may be used in connection with the ordinary detent, which is provided in the usual transmission, for holding the gear shift rail or bar in the several positions, when shifted thereto.

A further object of the invention is to provide means of the above mentioned character which may be installed upon the ordinary or standard transmission without materially altering the construction of the same.

As is well known, the ordinary automobile transmission, such as used upon the Chrysler automobile, embodies two gear shift rails or bars. One rail is employed to actuate the reverse and first speed gears while the other rail is employed to actuate the second and third speed gears. In order that each rail may be held against accidental displacement in the neutral position or either of the gear shifting positions, it is customary to provide a spring pressed ball or detent which engages within depressions or recesses formed in the gear shift rail or bar. It is well known that there is a tendency for the rail to improperly move out of the reverse position, when shifted thereto, and this is more pronounced in transmission gearing embodying an over-drive which may be made separate from or incorporated in the transmission gearing. The invention is also adapted for use in transmission gearing not embodying the over-drive.

In the accompanying drawing forming a part of this application and in which like numerals are employed to designate like parts throughout the same, Figure 1 is a longitudinal section through transmission gearing embodying my invention, taken on line 1—1 of Figure 2, showing parts in section, Figure 2 is a plan view of the gear shift rails or bars, and, Figure 3 is a perspective view of the reverse and low gear shifting rail or bar.

In the drawing, wherein for the purpose of illustration is shown a preferred embodiment of my invention, the numeral 5 designates transmission gearing for an automobile or the like preferably embodying an over-drive unit, not shown. This transmission gearing embodies the usual shifting lever 6, generally vertically arranged, and pivotally supported so that it may be swung between its ends longitudinally and transversely of the automobile, as is well known. The lower end 7 of this shifting lever is adapted to assume a neutral position and to be shifted from this neutral position to alternately engage in notches or recesses 8 and 9, formed upon the forward ends of reverse and first speed gear shift rail or bar 10 and second and third speed gear shift rail or bar 11, respectively.

The invention is illustrated as applied to the rail or bar 10, since it is this rail or bar which more frequently improperly moves out of the reverse position, particularly where the transmission embodies an over-drive. The rails 10 and 11 operate upon stationary guides 12 and 13, and are held thereon by transverse retainers 14 and 15, in turn rigidly attached to stationary parts of the housing by bolts 16 and 17 respectively.

The reverse and first speed gear shift rail or bar 10 is provided upon its lower side with a neutral recess or depression 18, a reverse recess or depression 19 and a first speed recess or depression 20, spaced and arranged in a longitudinal group, as shown. The numeral 21 designates a spring pressed ball or detent to enter the recesses or depressions 18, 19 and 20 in succession. When the rail 10 is shifted to the neutral position the ball 21 will enter the recess 18, when shifted to the reverse position the ball 21 will enter recess 19, and when shifted to the first speed position the ball 21 will enter recess 20. When the rail or bar 10 is shifted to the reverse position, Figure 1, the same frequently improperly moves out of this reverse position when the automobile is being backed, and this is particularly true where the transmission gearing embodies an over-drive. The foregoing is the usual construction.

My invention embodies means to prevent this improper movement of the gear shift rail or bar 10 from the reverse position. In accordance with my invention, I provide a transverse reverse groove 23 upon the upper side of the rail or bar 10, having a width corresponding to that of the reverse recess 19 and an elongated combined neutral and first speed recess or groove 24 upon such upper side, having a length equal to the distance from the outer side of the recess 18 to the outer side of the recess 20. These recesses are arranged in a longitudinal group. I drill a hole 25 in the retainer 14 and the center of this hole is in alignment with the central longitudinal axis of the rail or bar 10. The central transverse axis of the transverse recess 23 and the central longitudinal axis of the elongated recess 24 are in alignment with the central longitudinal axis of the rail 10. The opening 25 is adapted to receive a ball or detent 26, which is adapted to move therethrough, and to enter the transverse recess 23 and the longitudinal recess 24, in succession. Arranged upon the upper side of the retainer 14 is a stout strong leaf spring 27, having an upwardly bulging pocket 28 to receive the ball or detent 26. The leaf spring 27 has an opening 29 at its opposite end, to receive the adjacent bolt 16, which may be removed and then returned in place to hold the spring 27 in position.

The operation of the device is as follows:

When the gear shift rail or bar 10 is in the neutral position, the ball or detent 26 is in the forward end of the elongated longitudinal recess 24, and the rail or bar 10 may be shifted from this neutral position to the first speed position without the ball or detent 26 opposing the longitudinal movement of the rail or bar 10, the ball 21 functioning in the usual manner. When the rail or bar 10 is moved from the neutral position to the reverse position, Figure 1, the detent or ball 26 rides out of the elongated recess 24 and enters the transverse recess 23, and thus serves to hold the rail or bar 10 in this reverse position, against accidental or improper displacement. Due to the fact that the spring 27 is stout and strong, this holding action is sufficient to hold the rail or bar 10 against displacement in the reverse position and of course the ball or detent 26 coacts with the ball or detent 21, for this purpose. The ball or detent 21 and the recesses 18, 19 and 20 are of the usual construction, and an important feature of my invention is that my device or attachment may be used in connection with the ball or detent 21 without increasing the holding action when the rail or bar 10 is in the neutral or first speed position and materially increasing the holding action when the rail or bar 10 is shifted to the reverse position. The detent 21 is ordinarily sufficient to hold the rail or bar 10 in the neutral and first speed positions.

It is to be understood that the form of my invention herewith shown and described is to be taken as a preferred example of the same and that various changes in the shape, size, and arrangement of parts, may be resorted to, without departing from the spirit of my invention or the scope of the subjoined claims.

Having thus described my invention, what I claim and desire to protect by Letters Patent is:

1. In transmission gearing, a reverse and first speed shifting bar having reverse, neutral and first speed recesses formed upon one side thereof in a longitudinal group, a spring pressed detent to enter the recesses in succession, said bar being provided upon its opposite side with a recess having a width corresponding to the width of the reverse recess and an elongated recess, the last named recesses being arranged in a longitudinal group, and the elongated recess having a length substantially equal to the distance between the outer sides of the neutral and first speed recesses, a retaining rail arranged upon the same side of the shifting bar with the elongated recess and having an opening formed therein, a stout leaf spring arranged upon the retaining rail and attached thereto, and a detent arranged within the opening of the rail and engaged by the leaf spring and moved thereby toward the bar to enter the second named recesses formed upon the same.

2. In transmission gearing, a reverse and first speed shifting bar having reverse, neutral and first speed recesses upon one side and a reverse recess and a combined neutral and first speed recess upon its opposite side, a spring pressed detent to enter the recesses upon the first named side of the bar, and a spring pressed detent to enter the recesses upon the second named side of the bar.

3. In transmission gearing, a reverse and first speed shifting bar having reverse, neutral and first speed recesses arranged in one group and a reverse recess and a combined neutral and first speed recess arranged in another group, a spring pressed detent to enter the recesses in the first group, a spring pressed detent to enter the recesses in the second group, the length of the combined recess being such that its detent will remain therein when the neutral and first speed recesses receive their detent therein.

4. In transmisison gearing, a reverse and first speed shifting bar having reverse, neutral and first speed recesses arranged upon its lower face and having a reverse recess and an elongated combined neutral and first speed recess formed upon its upper face, a guide rail arranged above the bar and having an opening, a bolt to hold the guide rail in place, a leaf spring having an opening near one end to receive the bolt, and a detent operating within the opening of the guide rail and forced inwardly by the leaf spring and adapted to enter the recesses upon the upper face of the bar.

ELMER J. WOLTERSDORF.